United States Patent [19]

Kleck et al.

[11] Patent Number: 5,027,058
[45] Date of Patent: Jun. 25, 1991

[54] MULTI-STANDARD VIDEO OPTION FOR OSCILLOSCOPE

[75] Inventors: Jeffrey A. Kleck, Vancouver, Wash.; Andrew J. Burkhardt, Guernsey, United Kingdom; Steven R. Bingold, Portland, Oreg.

[73] Assignee: Tektronix, Inc., Beaverton, Oreg.

[21] Appl. No.: 486,021

[22] Filed: Feb. 26, 1990

[51] Int. Cl.$^5$ ...................... G01R 13/00; H04N 17/02
[52] U.S. Cl. ................................. 324/121 R; 358/10; 358/139; 364/487
[58] Field of Search ............... 324/121 R; 358/10, 83, 358/139; 364/487

[56] References Cited

U.S. PATENT DOCUMENTS

| | | | |
|---|---|---|---|
| 4,011,506 | 3/1977 | Bowden | 324/121 R |
| 4,743,844 | 5/1988 | Odenheimer et al. | 324/121 R |
| 4,843,562 | 6/1989 | Kenyon et al. | 364/487 |
| 4,875,089 | 10/1989 | Judge | 358/10 |
| 4,959,716 | 9/1990 | Bugni et al. | 358/139 |

Primary Examiner—Ernest F. Karlsen
Attorney, Agent, or Firm—Francis I. Gray

[57] ABSTRACT

A multi-standard vide option for an oscilloscope detects whether an input video signal has a bi-level or a tri-level horizontal sync pulse from a composite sync signal derived from the input video signal. A ramp signal is generated from the horizontal sync pulse having a slope of one polarity that changes to a slope of the opposite polarity when the horizontal sync pulse is tri-level. For a bi-level horizontal sync pulse the ramp is limited in magnitude and rapidly discharged at the end of the horizontal sync pulse. A digital output signal is generated from the ramp signal and has a width equal to the width of the horizontal sync pulse regardless whether it is bi-level or tri-level. From the type of horizontal sync pulse and the width or the number of lines per frame, a video standard is determined and is subsequently used to determine field identification and to automatically set up the horizontal sweep of the oscilloscope according to a selected video setup.

17 Claims, 16 Drawing Sheets

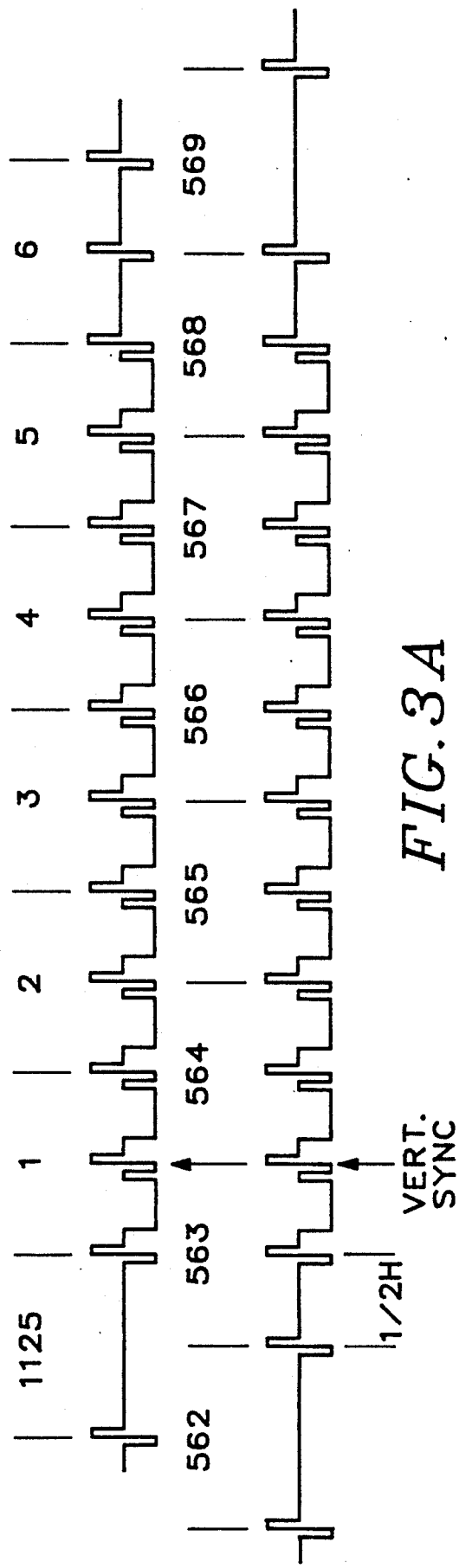
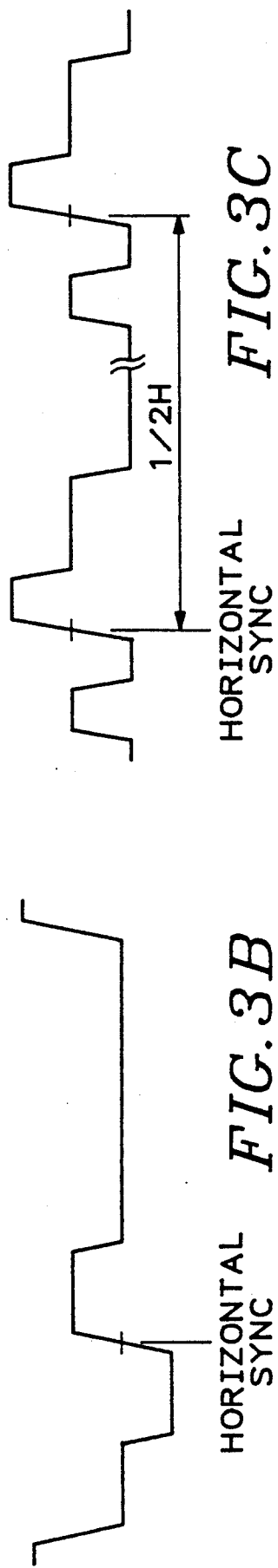

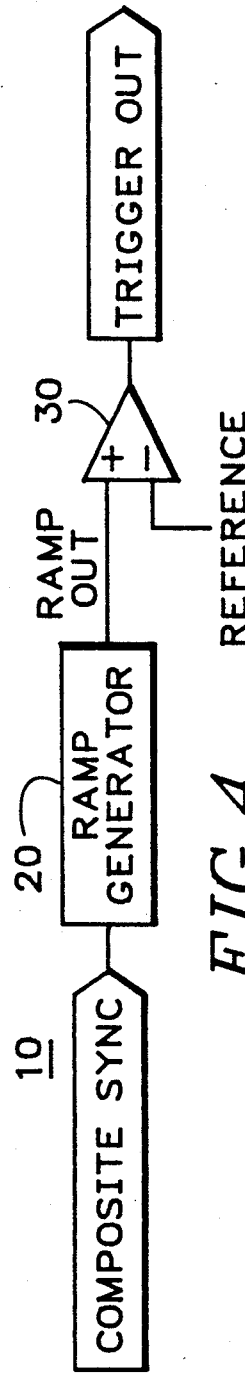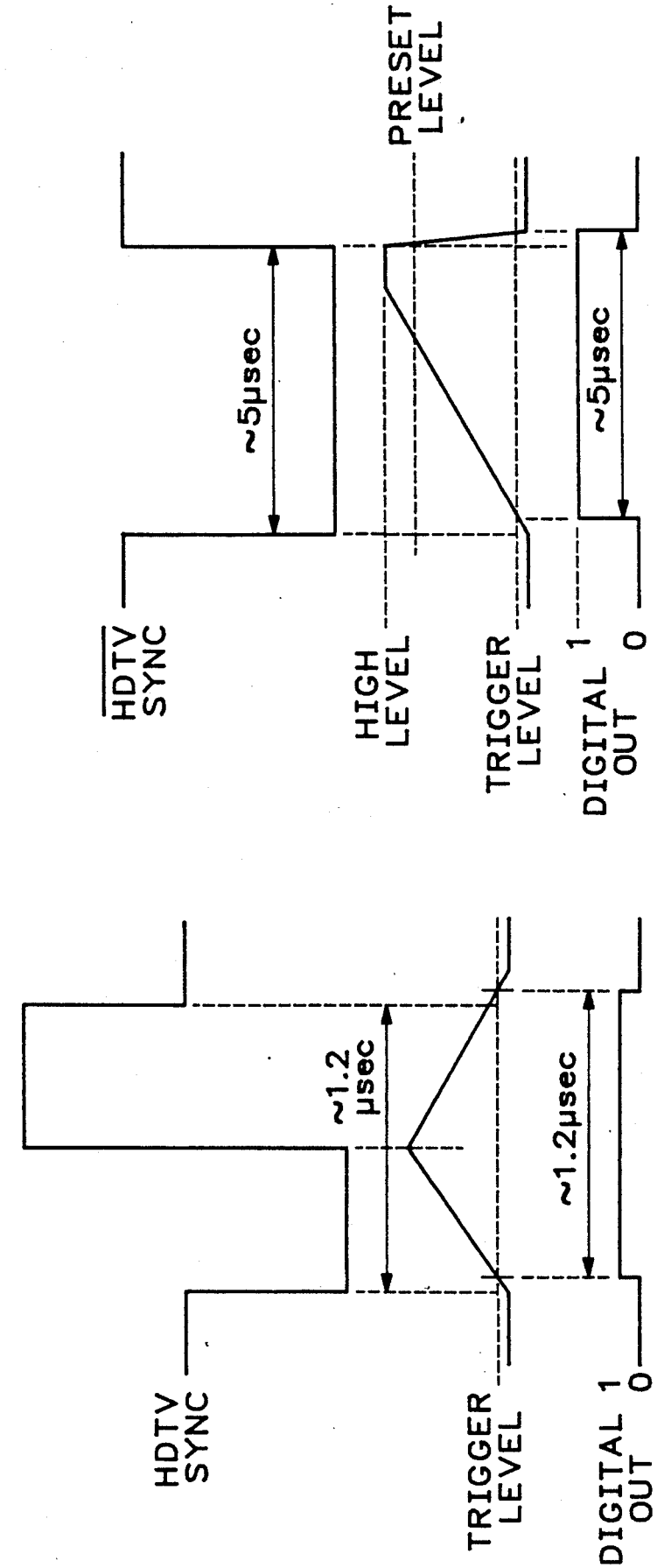

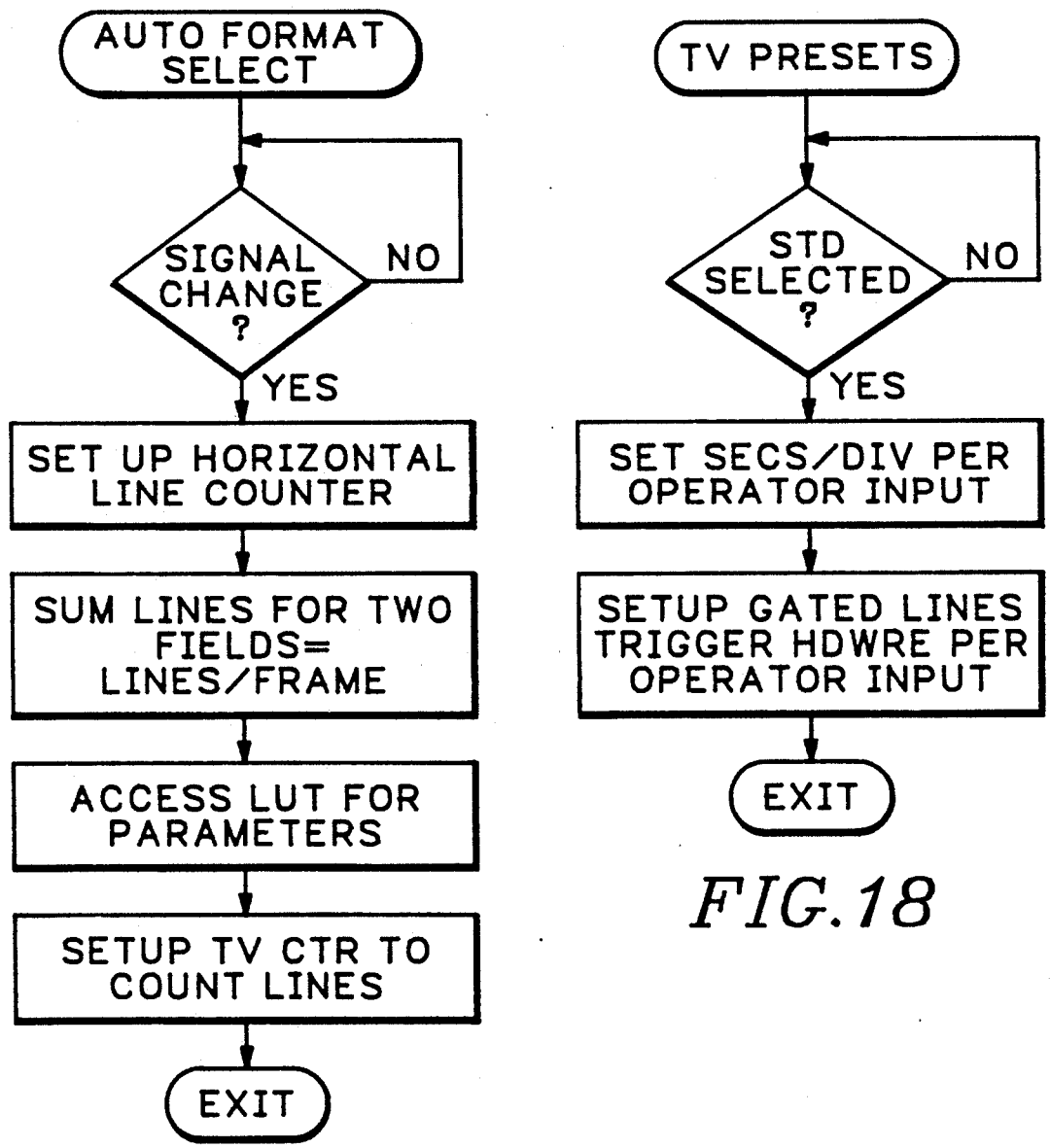

MULTI-STANDARD VIDEO OPTION FOR OSCILLOSCOPE

BACKGROUND OF THE INVENTION

The present invention relates to the display of video data on an oscilloscope, and more particularly to a multi-standard video option for an oscilloscope that automatically detects the standard of an input video signal and sets up the oscilloscope to display the input video signal.

In many television facilities where versatility is required at low budget costs, an oscilloscope that is used to do general electrical waveform analysis is also used to perform the functions of a high performance television waveform monitor. Such instruments include the 2400 Series Four Channel Oscilloscopes with Option 05, manufactured by Tektronix, Inc. of Beaverton, Oregon, United States of America. These instruments use a bi-level triggering system to generate a high true pulse equal to the duration of the horizontal sync pulse of a composite sync signal derived from an input video signal. This generated pulse is a digital signal that is used to trigger the oscilloscope at an appropriate horizontal interval. These instruments also are able to differentiate between the even and odd fields of an interlaced television signal, or determine that the television signal is a non-interlaced signal in the absence of even and odd fields.

With the current development of high definition television (HDTV) there exist three HDTV protocols, HDTV 1050/59.94, 1125/60 and 1250/50, actively being pursued in the television industry. Rather than a bi-level horizontal sync pulse as in the NTSC, as shown in FIG. 1, and PAL standard television protocols, the new HDTV protocols incorporate a new tri-level horizontal sync pulse, as shown in FIGS. 2 and 3.

What is desired is a multi-standard video option for an oscilloscope that automatically detects the standard of an input video signal, either conventional or HDTV, interlaced or non-interlaced, and sets up the oscilloscope to present an appropriate display.

SUMMARY OF THE INVENTION

Accordingly the present invention provides a multi-standard video option for an oscilloscope that automatically detects the standard of an input television signal and sets up the oscilloscope to present an appropriate display. An analog ramp generator is turned on during the first portion of a horizontal sync pulse within a composite sync signal. For an HDTV video signal when the horizontal sync pulse changes polarity, the slope of the output of the analog ramp generator is reversed. A comparator at the ramp generator output generates a high true digital signal equal to the time of the negative and positive portions of the tri-level HDTV composite sync, i.e., together with the ramp generator the comparator acts as a pulse doubler for the first half of the tri-level sync pulse since the plus and minus portions are symmetrical. For conventional television signals another comparator at the ramp generator output detects when the ramp output exceeds a preset level, and then discharges the ramp generator output rapidly at the end of the horizontal sync pulse. The result is a digital signal that equals in duration the horizontal sync interval, regardless of the format of the input video signal. Once the type of sync pulse is detected, the fields are identified and the number of lines per field/frame are counted to determine the video standard of the input signal. With the determination of the standard the oscilloscope hardware is automatically set up to present a display of the input video signal according to operator inputs.

The objects, advantages and other novel features of the present invention are apparent from the following detailed description when read in conjunction with the appended claims and attached drawing.

BRIEF DESCRIPTION OF THE DRAWING

FIGS. 3a, 3b and 3c are timing diagrams of the vertical interval for an 1125 HDTV television standard signal.

FIG. 4 is a block diagram of a multi-standard trigger circuit according to the present invention.

FIGS. 5a and 5b are waveform timing diagrams for the multi-standard trigger circuit of FIG. 4 representing a tri-level and a bi-level sync signal, respectively.

FIG. 17 is a flow chart diagram for an automatic format selection according to the present invention.

FIG. 18 is a flow chart diagram for a television preset function according to the present invention.

DESCRIPTION OF THE PREFERRED EMBODIMENT

Referring now to FIGS. 4 and 5 a bi-level/tri-level sync detection circuit 10 is shown. A composite sync signal from an input video signal is input to a ramp generator 20. The output of the ramp generator is an increasing analog ramp signal starting at the leading edge of the horizontal sync interval. When the sync signal reverses before the end of the horizontal sync interval, indicative of an HDTV input signal having a tri-level sync pulse, the ramp output signal reverses to provide a decreasing ramp signal. If however the increasing ramp output signal reaches a preset level before the end of the horizontal sync interval, indicative of a conventional television input signal having a bi-level sync pulse, then the ramp output signal is clamped at a high level until the trailing edge of the horizontal sync pulse occurs, at which point the ramp output signal is rapidly discharged to a low level. The ramp output signal is input to a comparator 30. The comparator 30 has a trigger level as the other input so that when the ramp output signal exceeds the trigger level a high-level digital output signal is generated. The high-level digital output signal may be used as a trigger signal for an oscilloscope.

Figure 6:
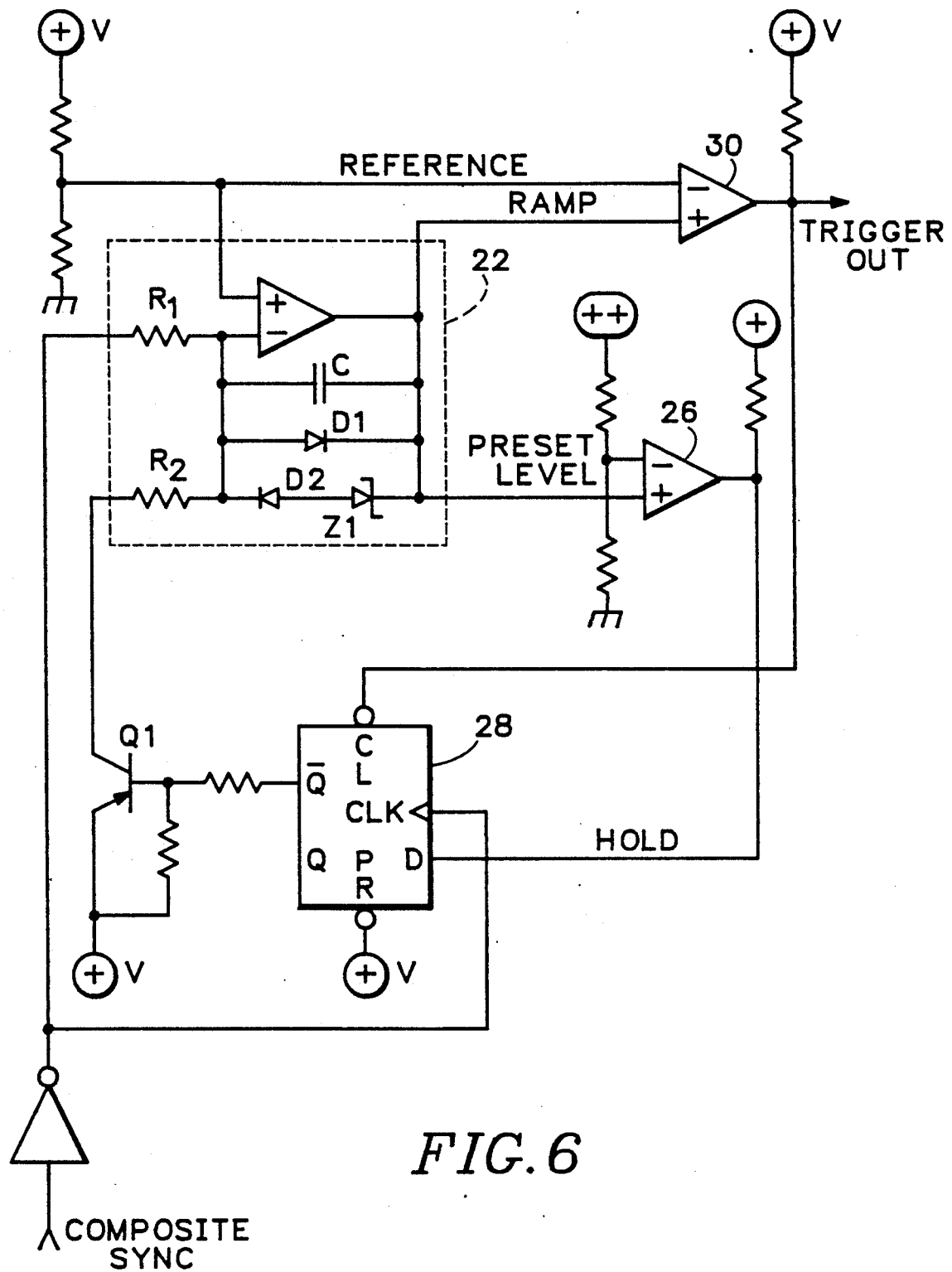
FIG. 6 is a schematic diagram of a first embodiment of the multi-standard trigger circuit of FIG. 4.

The ramp generator 20 is shown in a preferred embodiment in FIG. 6. The composite sync signal is input to an operational amplifier configured as a Miller integrator 22. The slope of the output of the Miller integrator 22 is a function of input resistors R1, R2, a capacitor C in the feedback loop of the operational amplifier, a reference voltage and a rail voltage V. At the leading edge of the horizontal interval the output of the Miller integrator 22 attempts to go to a high level, but due to the capacitor C the result is an increasing ramp output having a slope that is a function of the input resistor R1, the reference voltage and the capacitor. When the sync signal changes polarity, the output of the Miller integrator 22 attempts to switch to a lower level, but again due to the capacitor C the result is a decreasing ramp output having a slope that is a function of the input resistor R1, the difference between the reference voltage and the rail voltage, and the capacitor. The reference level is compared with the ramp output of the Miller integrator 22 by the comparator 30 having the ramp output and the reference level as inputs to produce the digital output signal. A zener diode Z1 in the Miller integrator 22 feedback circuit limits the maximum level of the ramp output to a predetermined level to prevent overcharging the capacitor C and saturating the operational amplifier.

The ramp output from the Miller integrator 22 also is input to a second comparator 26 that has as the second input the preset level. When the ramp output exceeds the preset level, indicative of a bi-level horizontal sync pulse, the output of the second comparator 26 goes to a high level. The high level from the second comparator 26 is input to the D-input of a flip-flop 28 as a hold signal. When the polarity of the bi-level horizontal pulse reverses at the end of the sync interval, the hold signal is latched into the flip-flop 28, causing the \Q output to go low. \Q low biases "on" a transistor Q1 that discharges the capacitor C of the Miller integrator rapidly through the transistor and resistor R2. At the trailing edge of the digital output signal the flip-flop 28 is cleared so that the \Q output goes high, cutting off the transistor Q1 in preparation for the next horizontal sync pulse. For a tri-level horizontal sync pulse the preset level at the input of the second comparator 26 is not exceeded and the hold signal remains low, holding the \Q output of the flip-flop 28 high when the flip-flop is clocked so that the transistor Q1 remains cut off and the Miller integrator 22 discharges as a decreasing ramp.

Figure 7:
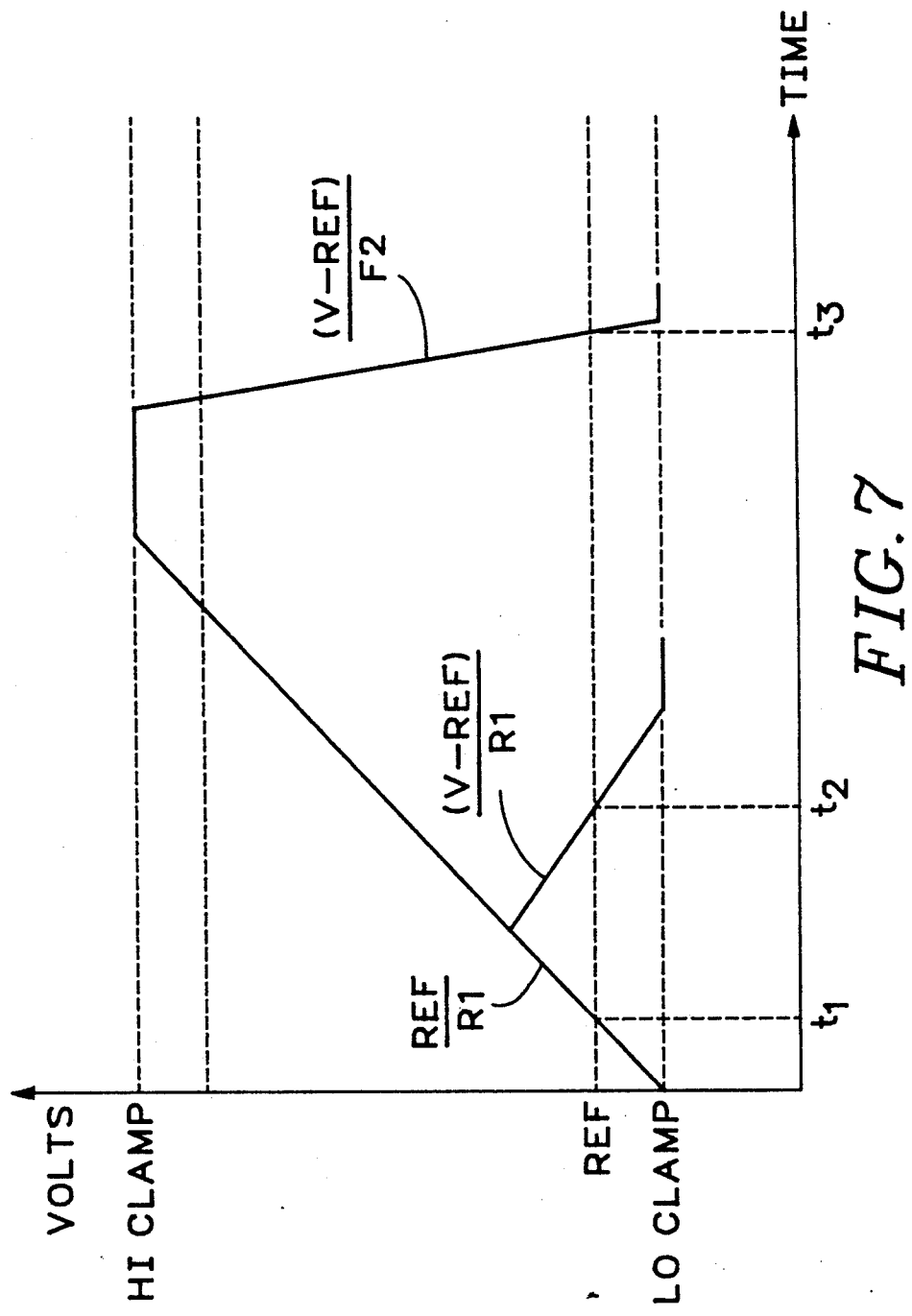
FIG. 7 is a waveform timing diagram for the output of the ramp generator of FIG. 6.

As shown in FIG. 7 the ramp signal is clamped between a low clamp level, which is the reference voltage less the diode drop across the diode D1, and a high clamp level, which is the reference voltage plus the diode drop across the diode D2 and the breakdown voltage drop across the zener diode Z1. At the leading edge of the horizontal sync interval the capacitor starts to charge at a rate that is a function of the reference voltage divided by the input resistance R1. When the horizontal sync pulse changes polarity in a tri-level sync signal, then the capacitor discharges through input resistor R1 at a rate that is a function of the difference between the voltage rail V and the reference voltage divided by the input resistance R1. The reference level is selected between zero and V so that the period of time that the ramp signal is above the reference level equals the period of the horizontal sync pulse. If the input signal has a bi-level sync pulse, then the ramp continues to charge through the capacitor until the high clamp level is reached. When the polarity of the horizontal sync pulse reverses at the end of the horizontal sync period, the capacitor is then discharged through the transistor Q1 at a rate that is a function of the difference between the voltage rail V and the reference voltage divided by the second resistor R2, the value of R2 being on the order of ten times smaller than the value of R1, to provide a fast discharge. The time interval t2-t1 is the tri-level sync period, and the time interval t3-t1 is the bi-level sync period.

Although only two comparators are shown in FIG. 6, additional comparators may be used for each different standard horizontal pulse width. The outputs of the comparators then are input to a decoder that provides a separate signal for each standard detected.

Figure 8:
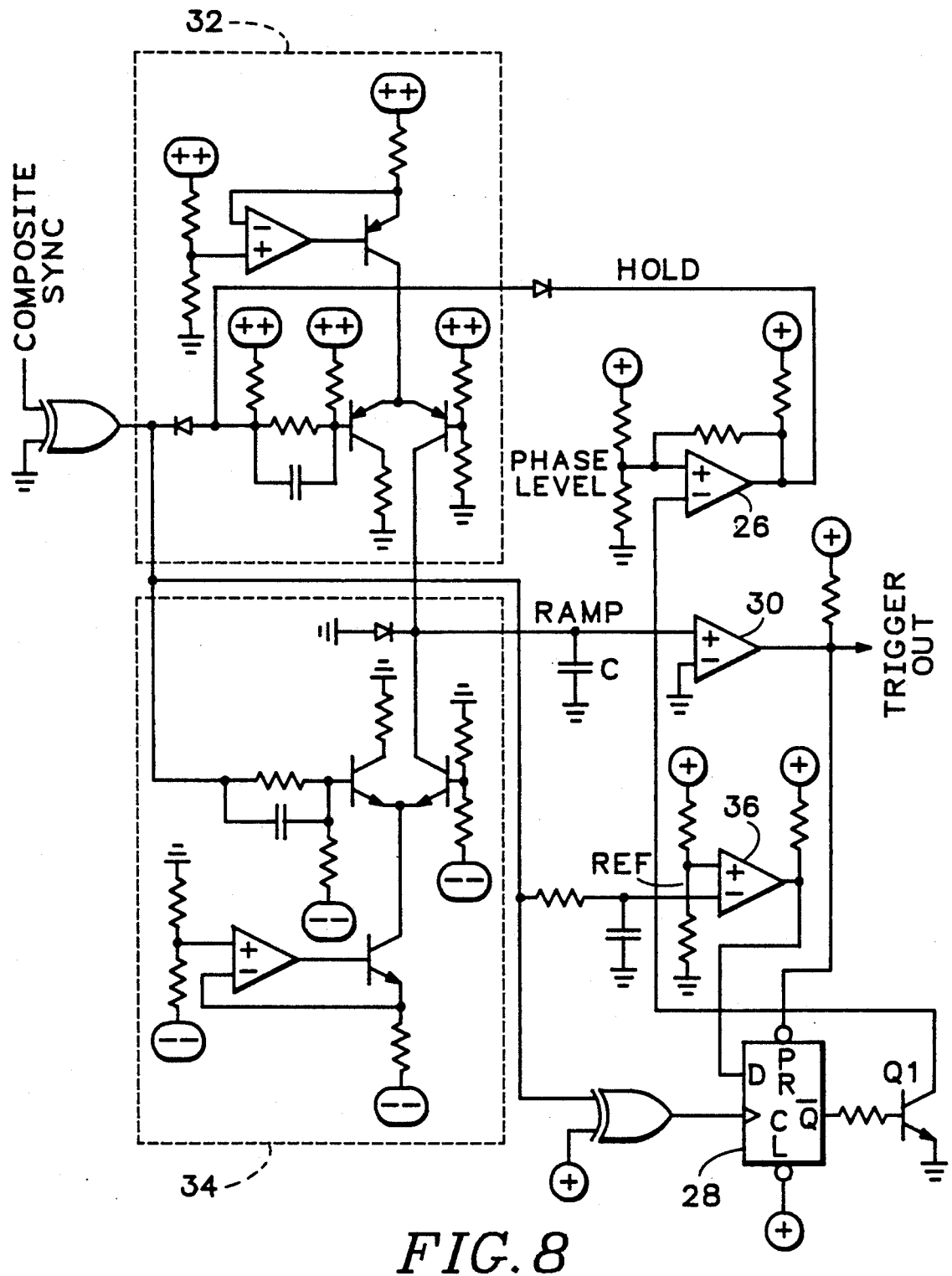
FIG. 8 is a schematic diagram of a second embodiment of the multi-standard trigger circuit of FIG. 4.
Figure 9:
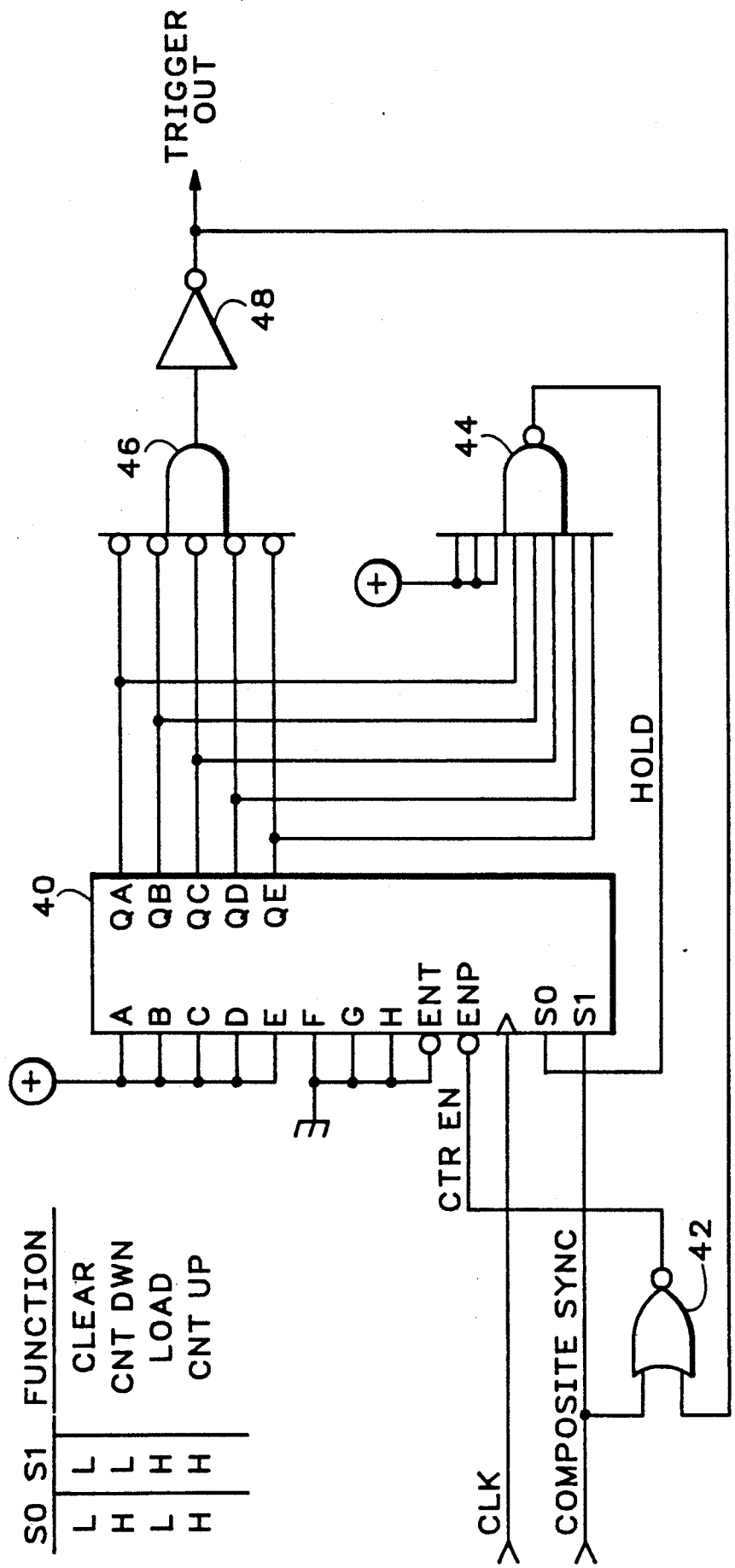
FIG. 9 is a schematic diagram of a third embodiment of the multi-standard trigger circuit of FIG. 4.
Figure 10:
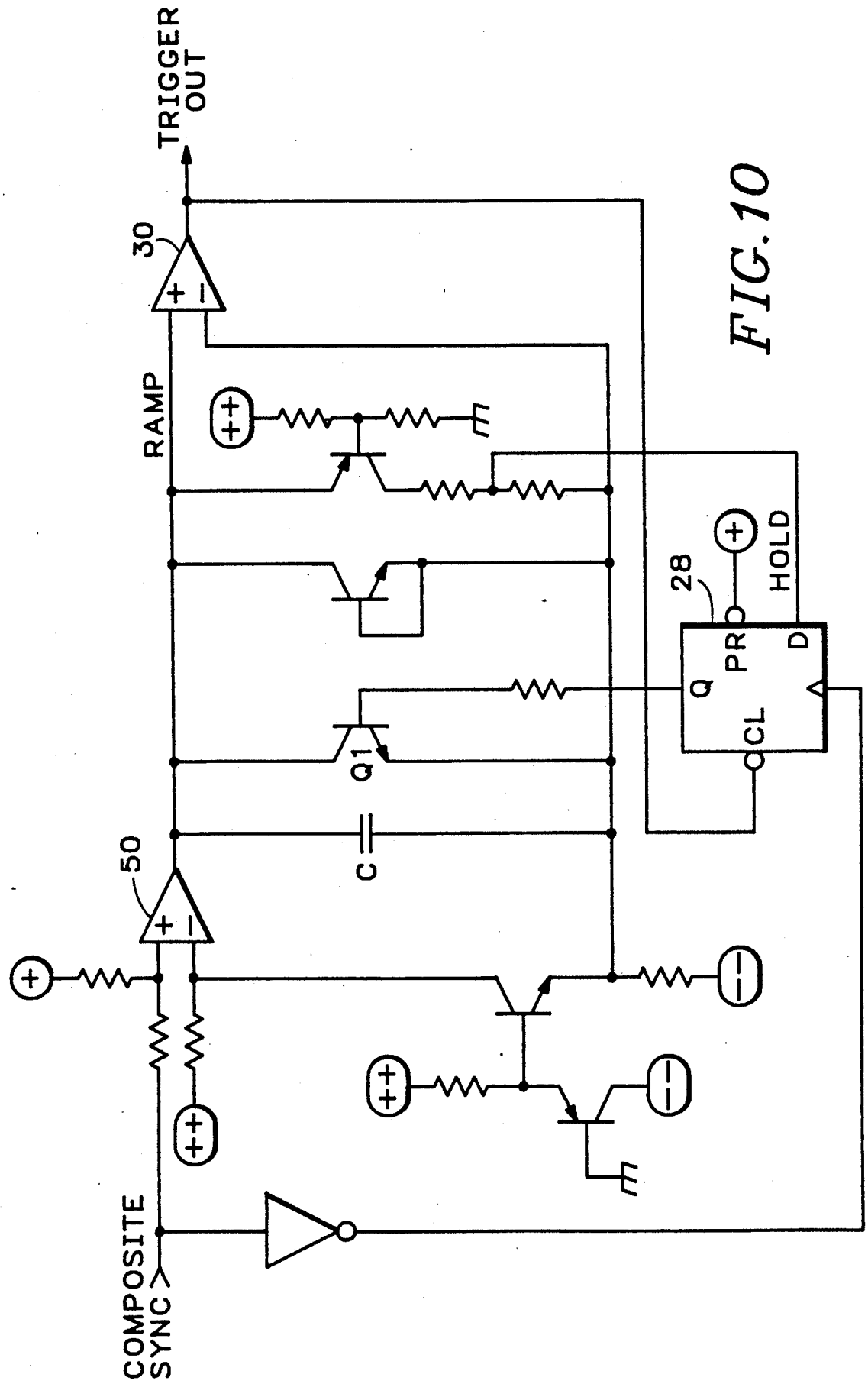
FIG. 10 is a schematic diagram of a fourth embodiment of the multi-standard trigger circuit of FIG. 4.

Other techniques for obtaining the ramp signal are shown in FIGS. 8-10. In FIG. 8 two switchable current sources 32, 34 charge the capacitor C. The top current source 32 charges the capacitor C during the negative portion of the composite sync and the lower current source 34 discharges the capacitor. The voltage across the capacitor is monitored by the comparator 30 to produce the digital output signal. Since, as with all the analog approaches, the highest voltage level of the ramp output is directly related to the width of the first portion of the composite sync, the particular standard/protocol may be determined by using various comparators having different preset levels according to the pulse width of the particular standard being determined by that comparator. The comparator 26 provides the hold signal that limits the maximum voltage level of the ramp output by switching off the top current source 32, maintaining the current charge on the capacitor C until the composite sync switches polarity. Another comparator 36 compares a delayed value of the composite sync with another reference level indicative of a bi-level horizontal pulse to produce a low output at the D input of the flip-flop 28. When the composite sync switches polarity at the end of a bi-level horizontal sync pulse, the low at the D input is latched in the flip-flop 28 to provide a high at the \Q output that turns on the transistor Q1. The transistor Q1 rapidly discharges the capacitor C. The digital output signal presets the flip-flop 28 to cut off the transistor Q1 at the end of the digital output signal. This approach is very component intensive to build the switchable current sources.

FIG. 9 illustrates a digital approach to duplicate the analog ramp with a single digital counter 40. The first portion of the composite sync signal goes high, enabling the counter 40 via NOR gate 42. With the counter 40 cleared to all zeros, the output of NAND gate 44 is high. With the counter 40 enabled and both the S0 and S1 inputs high, then the counter starts to count up the clock pulses. The counter outputs, QA-QE, instead of being all zeros, now include ones so that the output of an AND gate 46 with all inputs inverted results in a low output. The low output from the AND gate 46 is inverted by an inverter 48 to produce the digital output signal high. The digital output signal is fed back via NOR gate 42 to act as the counter enable signal so long as the digital output signal is high. For a tri-level sync input, midway through the horizontal pulse interval the input S1 goes low, and with the output of the NAND gate 44 still high the counter 40 starts to count down. When the output of the counter 40 reaches zero, the output of the AND gate 46 goes high, terminating the digital output signal which in turn disables the counter. For a bi-level sync input the count continues up until the outputs are all high, and the output of the NAND gate 44 goes low. The inputs to the counter 40 are then loaded as all high at each clock pulse, maintaining the output of the counter at all high levels. When the horizontal sync pulse interval is over, the input to S1 goes low and the counter 40 is cleared to all zeros at the output, again terminating the digital output signal and disabling the counter. However due to the asynchronous nature of the input video signals with respect to the clock signal, there is a variation in the trigger output signal of one clock pulse which may lead to objectionable jitter on a television display. This jitter may be cured if the clock is related to the video subcarrier.

Another approach shown in FIG. 10 is to use an operational transconductance amplifier (OTA) 50 and drive its output into the capacitor C. Again the ramp is compared with a preset level to generate a hold signal that is input to the flip-flop 28 to switch on transistor Q1 to rapidly discharge the capacitor C when the input is a bi-level sync signal, while still having an increasing/decreasing ramp signal for a tri-level sync signal. However, due to variations in the open loop gain of the OTA 50, this approach may have difficulty in detecting the different standards based on the voltage level of the ramp.

Figure 1:
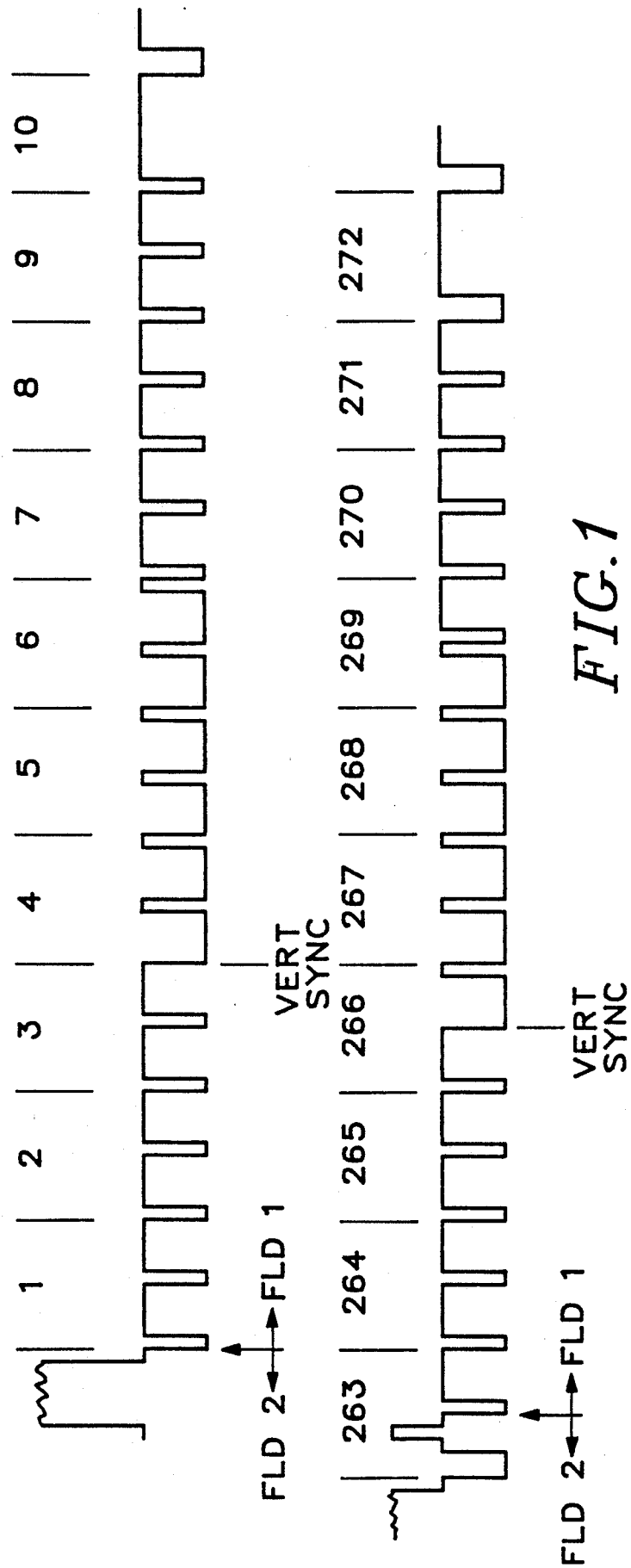
FIG. 1 is a timing diagram of the vertical interval NTSC television standard signal.
Figure 2A:
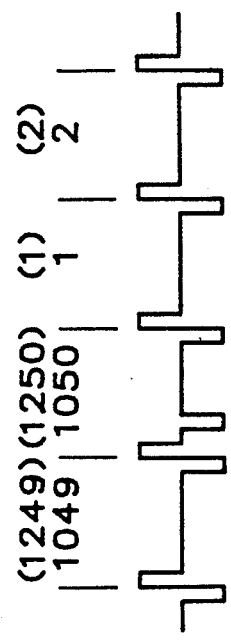
FIGS. 2a and 2b are timing diagrams of the vertical interval for 1050/1250 HDTV television standard signals.
Figure 2B:
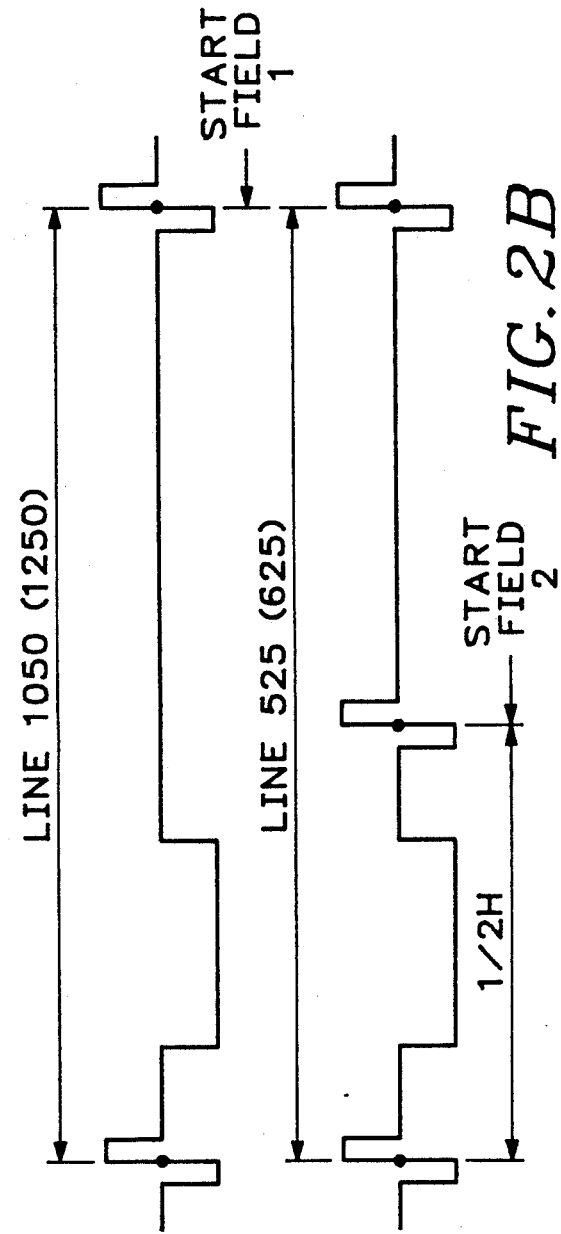

Once the digital output signal has been generated equal in duration to the horizontal sync period, then field identification is performed to determine whether the input signal is interlaced or non-interlaced, and whether the field is even or odd. The prior art field identification circuit needed only to differentiate between an interlaced and a non-interlaced signal. A non-interlaced signal does not have even and odd fields. The interlaced signal for standard television signals and for HDTV 1125 has a half line of active video inserted just prior to the vertical interval as shown in FIGS. 1 and 3, respectively, i.e., for NTSC the start of field one is defined by a whole line between the first equalizing pulse and the preceding horizontal pulse and the start of field two is defined by one-half line between the first equalizing pulse and the preceding horizontal pulse. However for two of the HDTV protocols, HDTV 1050/1250 as shown in FIG. 2, during the vertical interval the odd field has one full horizontal line, but the even field has two half-lines.

Figure 11:
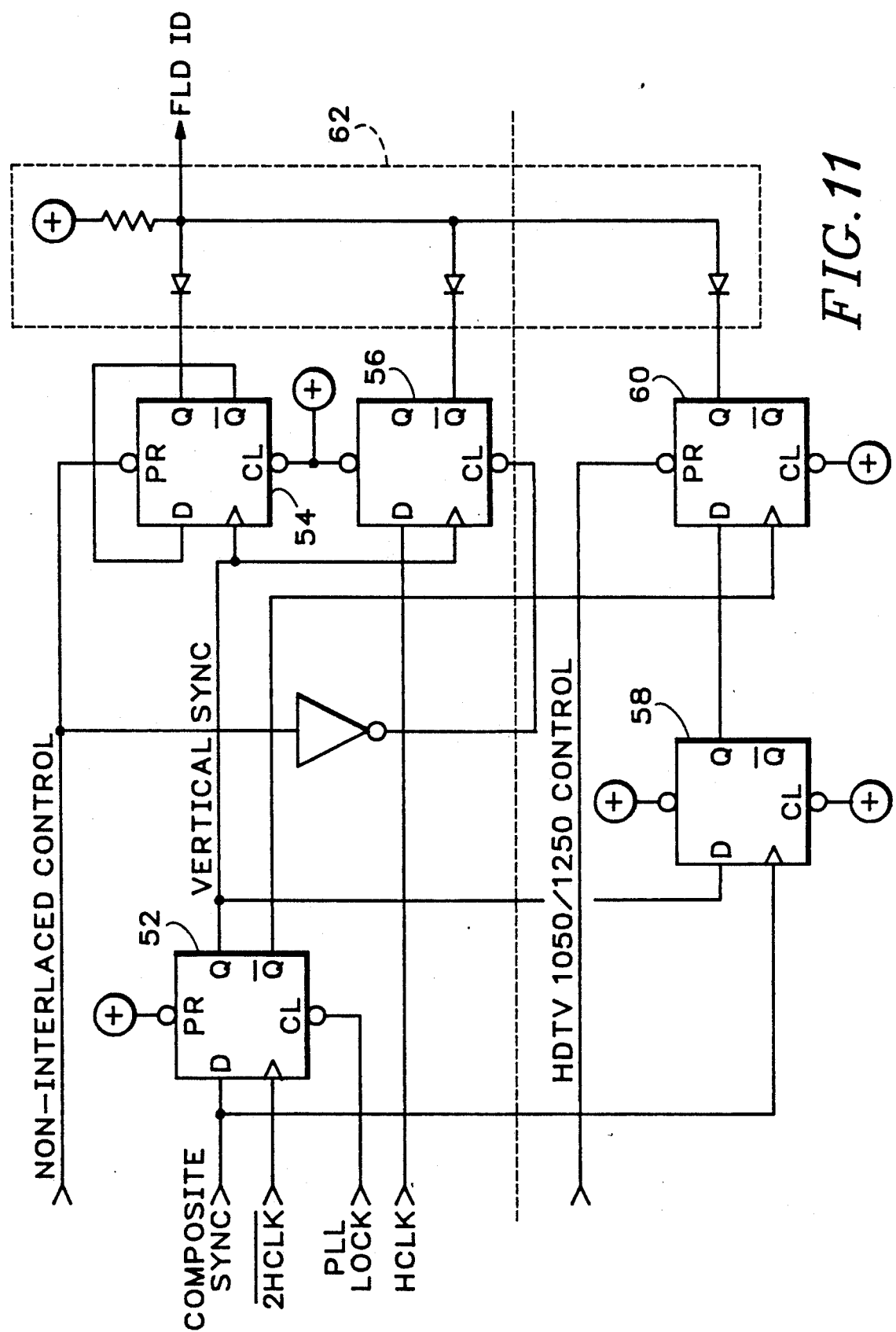
FIG. 11 is a schematic diagram of a multi-standard field identification circuit according to the present invention.

Referring now to FIG. 11 an input flip-flop 52 is clocked by a clock at twice the horizontal line rate frequency. The output is a vertical sync pulse during the vertical interval. The Q output of the input flip-flop 52 is used to clock a non-interlaced flip-flop 54 configured as a divide by two counter when enabled by a non-interlaced control signal. An interlaced flip-flop 56 samples a horizontal clock signal at the start of the vertical sync pulse to determine in which half of the horizontal clock signal vertical sync starts. For field one the horizontal clock signal is high, while for field two the horizontal clock signal is low. Therefore the \Q output of the interlaced flip-flop 56 is high, indicative of field two. For the two specific HDTV protocols the composite sync is used to clock the vertical sync signal into an HDTV input flip-flop 58. The Q output of the HDTV input flip-flop 58 is high for an even field and low for an odd field. The Q output is sampled by the inverse of the vertical sync pulse, i.e., at the end of the vertical interval, in a second HDTV flip-flop 60 since the first HDTV flip-flop 58 can only be sampled once per vertical interval. The outputs of the flip-flops 54, 56, 60 are input to an AND gate 62 to provide a high output for even fields and a low output for odd fields.

Figure 12:
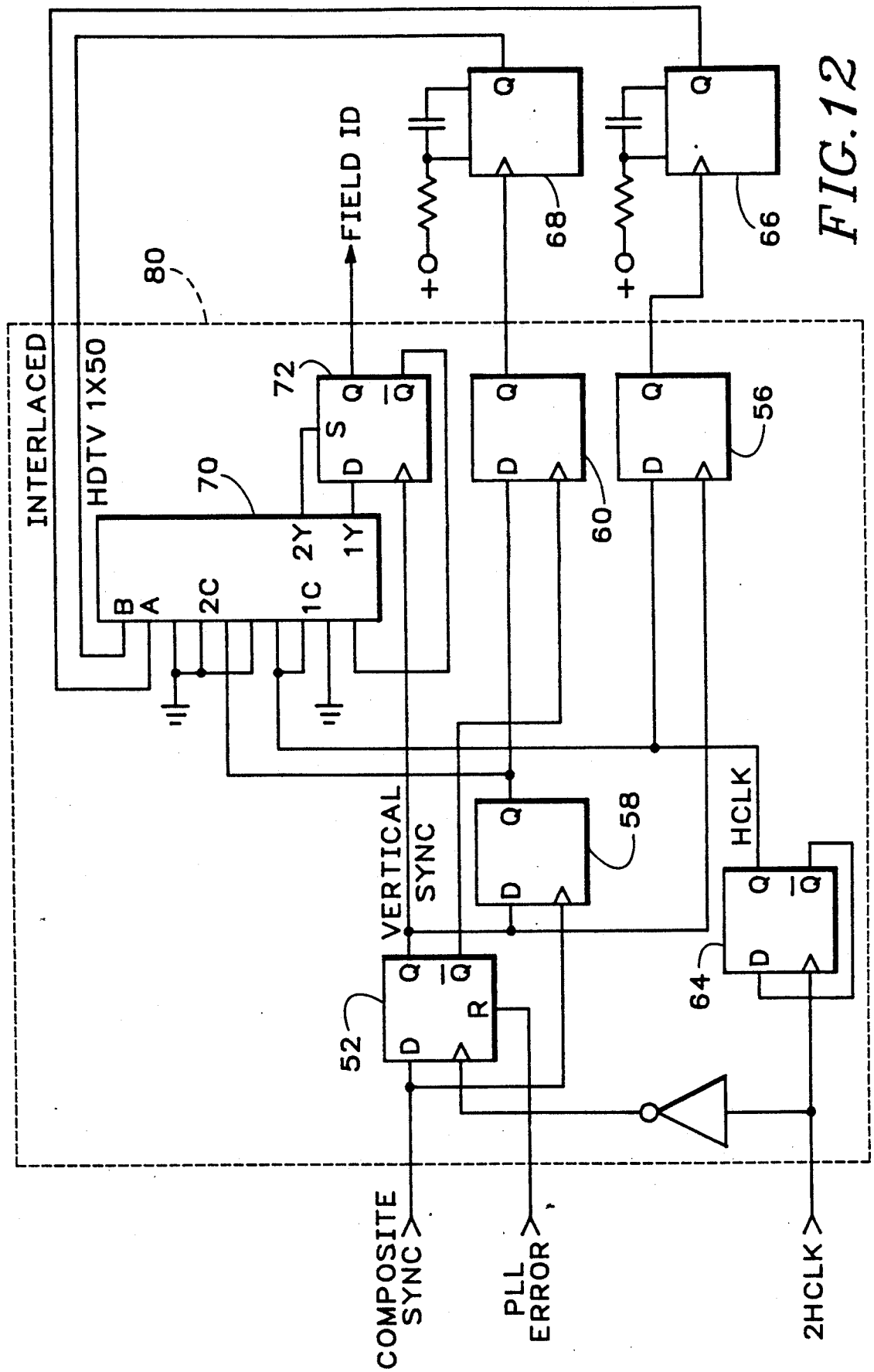
FIG. 12 is a schematic diagram of a second embodiment of the multi-standard identification circuit according to the present invention.

As shown in FIG. 12 the horizontal clock signal is derived from the twice horizontal clock signal via a clocked flip-flop 64 configured as a divide by two counter. The outputs of the interlaced flip-flop 56 and the second HDTV flip-flop 60 are input to respective retriggerable one-shot multivibrators 66, 68 having time constants greater than one field, i.e., greater than 40 msec for 50 Hz systems and greater than 33 msec for 60 Hz systems. If the multivibrators 66, 68 time out, then a non-interlaced standard is present. If multivibrator 66 times out while multivibrator 68 does not, then the input signal is an HDTV 1050/1250 signal. If the multivibrator 66 does not time out, then the input signal is a conventional or an HDTV 1125 signal. The outputs of the multivibrators 66, 68 are input to a logic array 70 together with the horizontal clock signal and the odd-/even output from the input HDTV flip-flop 58. An output flip-flop 72 together with the logic array 70 perform the function of the control signals, the non-interlaced flip-flop 54 and the AND gate 62 of FIG. 11. For a non-interlaced standard the logic array 70 configures the output flip-flop 72 as a divide by two counter and counts the vertical sync pulses, alternating between odd and even field indications on alternate vertical sync pulses. For an interlaced standard, either conventional or HDTV, the logic array sets the output flip-flop 72 to the appropriate field by setting the flip-flop to a high output for the even fields and resetting to a low output for odd fields.

Figure 13:
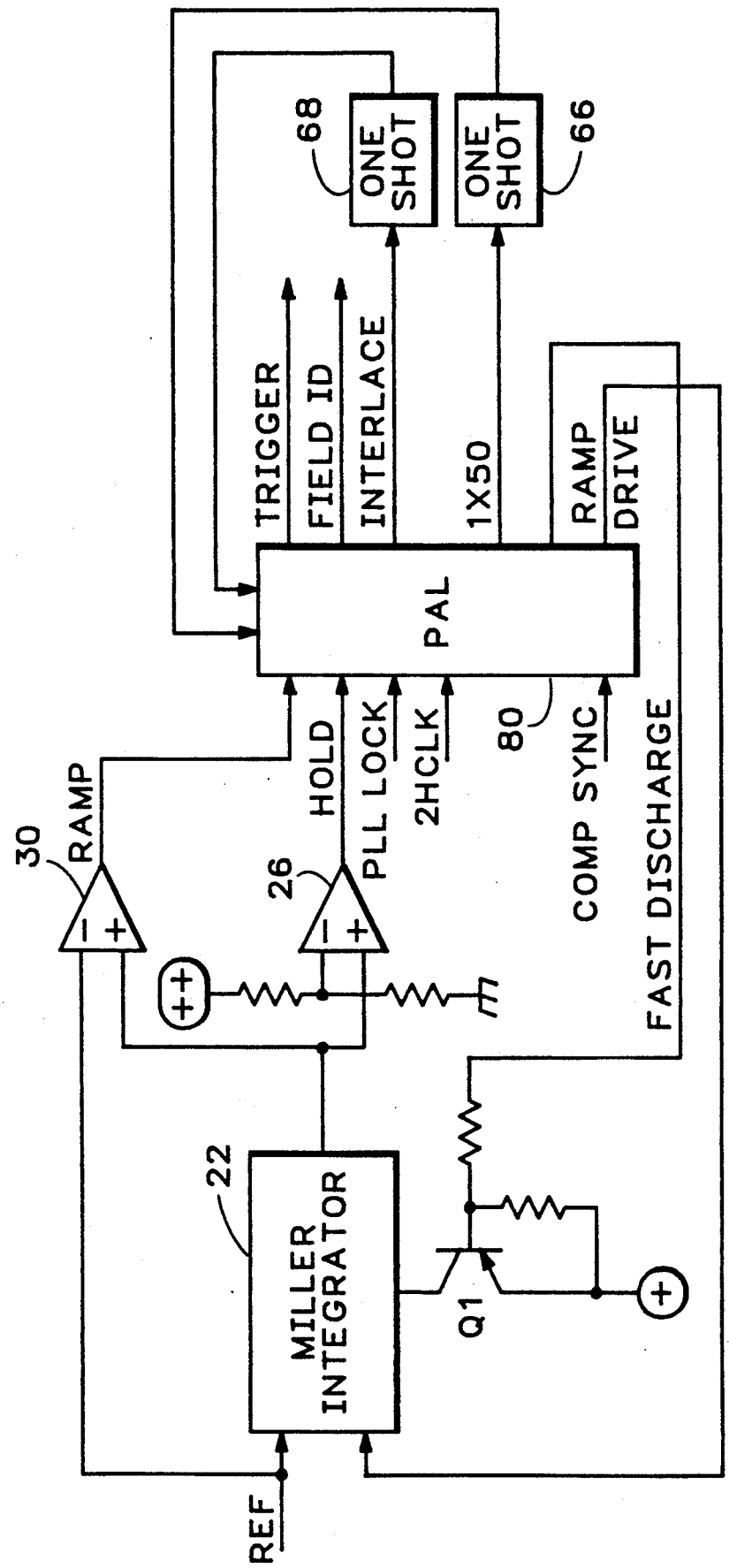
FIG. 13 is a schematic diagram of an embodiment of the multi-standard television option according to the present invention.

As shown in FIG. 13 the flip-flops 52, 56, 58, 60, 64, 72 and the logic array 70 are replaced with a programmable array logic (PAL) circuit 80. The PAL circuit 80 performs the functions that are described in more detail above. An additional function is to convert the composite sync signal from the input video signal into a ramp drive signal so that pulses occur at a horizontal sync interval rate having a width equal to the first part of the horizontal pulse for tri-level sync and to the entire horizontal pulse for bi-level sync. The ambiguities that could result during the vertical interval when there are pulses at the one-half line rate, or where there are pulses having other than normal pulse widths, such as the equalizing pulses of an NTSC signal, are masked so that only the true horizontal sync pulses are used to drive the ramp generator 20. Also the PAL circuit 80 determines the field identification, differentiating between HDTV 1050/1250 and all other television standards as described above.

Figure 14:
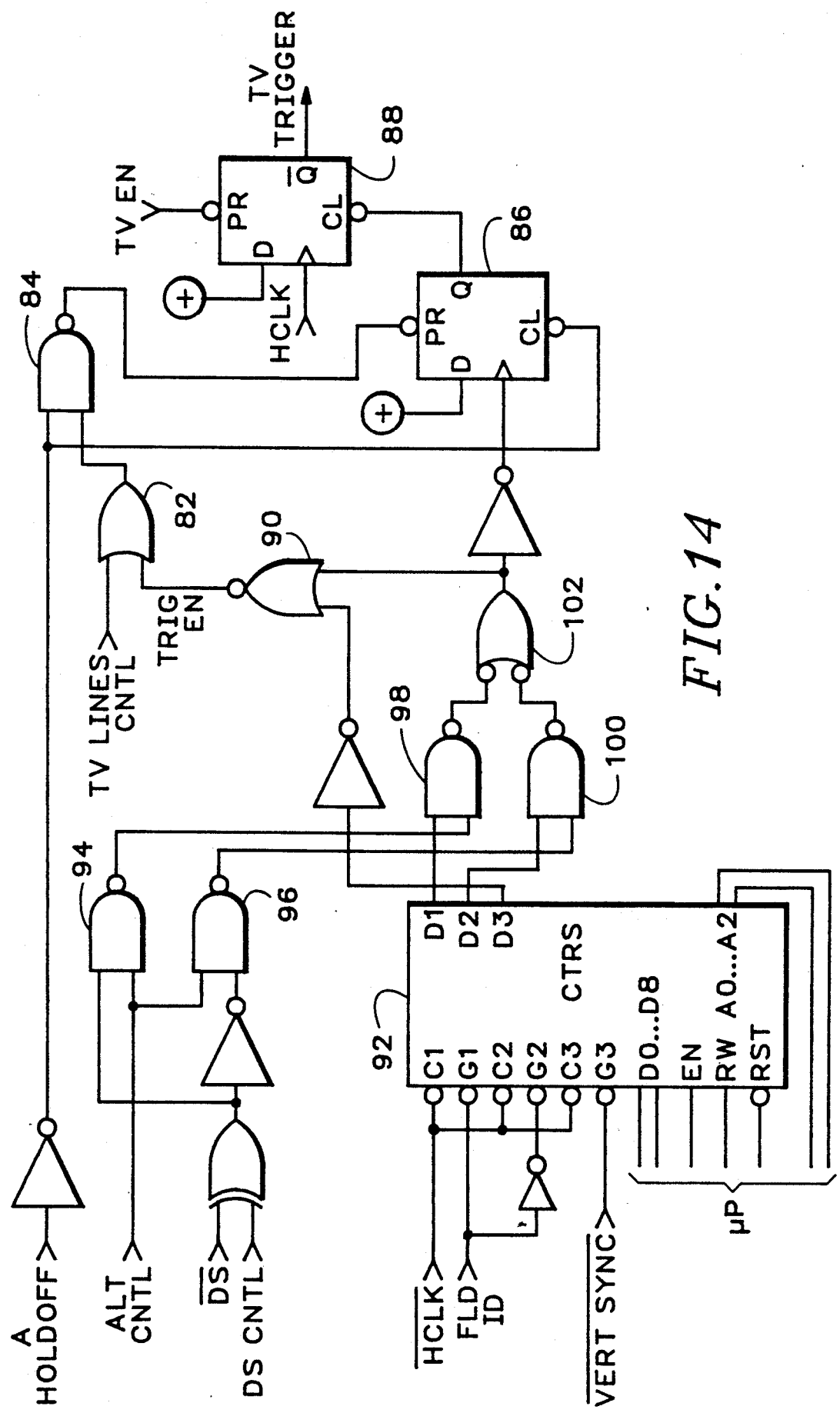
FIG. 14 is a schematic diagram of a multi-standard active video/gated lines trigger circuit according to the present invention.
Figure 15:
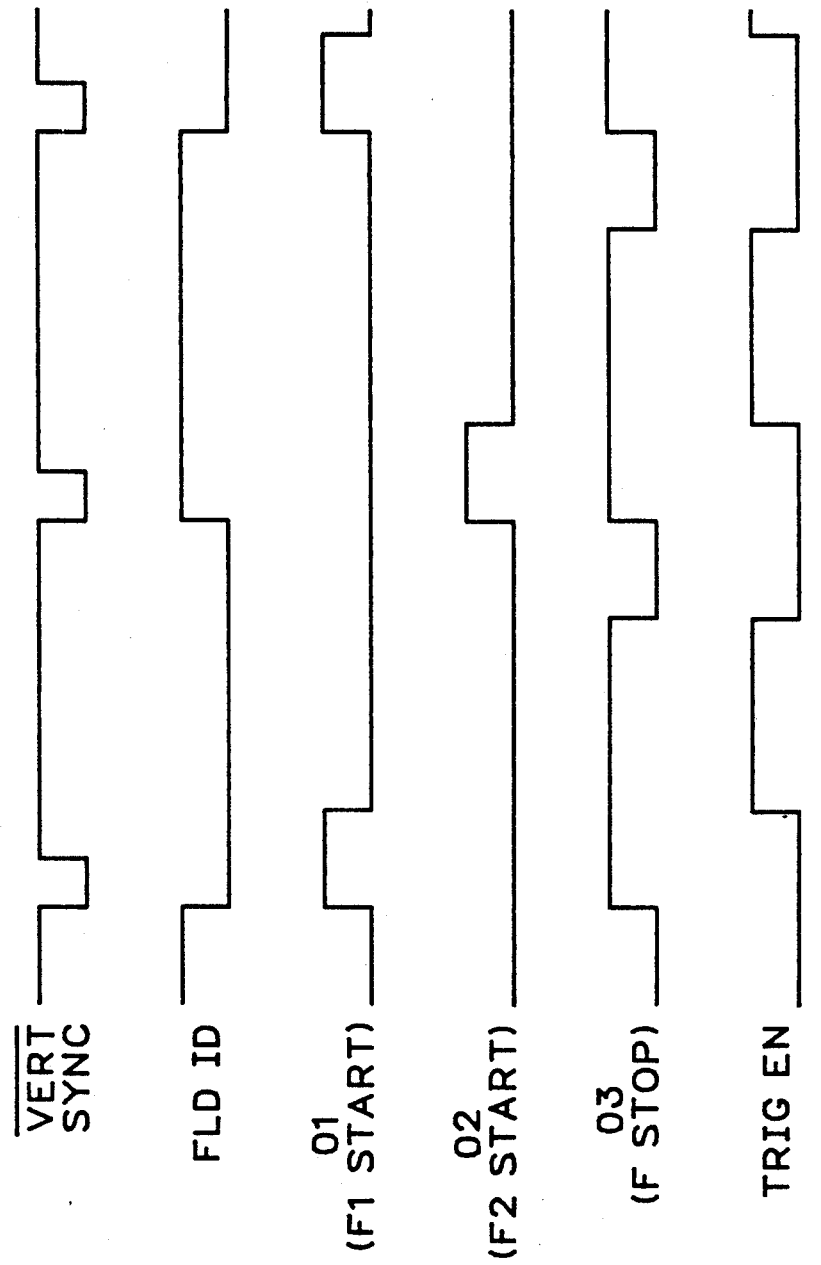
FIG. 15 is a waveform timing diagram for the gated lines trigger circuit of FIG. 14.

Currently when a television lines mode is selected by an operator at the instrument, a television trigger signal is generated with equal probability on any horizontal line within a video frame, including those within the vertical interval. An active video mode, or gated lines mode, is provided that allows a TV trigger signal to be generated only during specified active lines of video. Selecting the active video mode without specifying the start and stop lines automatically selects the start and stop lines according to the detected video standard for the entire active video. Referring now to FIGS. 14 and 15 the output of OR gate 82 provides an enable signal for NAND gate 84 that passes a holdoff signal to a first flip-flop 86 preset input. The first flip-flop 86 acts as an arming gate for a second flip-flop 88 that actually generates the trigger signal that is applied to the horizontal drive circuitry of the oscilloscope. When in the gated trigger mode the TV LINES CNTL line is held low so that in order for the output of the OR gate 82 to be high, the output of a NOR gate 90 must be high. For the output of NOR gate 90 to be high, three conditions need to be met, as is discussed below. A counter circuit 92 has at least three counters, each of, which count the HCLK signal when enabled by FIELD 1 ID, FIELD 2 ID and \VERT SYNC, respectively. The outputs of the counter circuit 92 provide a field 1 start signal, a field 2 start signal, and a stop signal for both fields. An alternate control signal applied to NAND gates 94, 96 is held low to enable NAND gates 98, 100.

The F1 start output of the counter circuit 92 is enabled by the \VERT SYNC signal and the FLD ID signal being low. The counter circuit 92 provides a high output for F1 START until a predetermined number of horizontal clock cycles have been counted, at which point the output goes low. Likewise the F2 START signal at the second output generates a positive pulse starting at the beginning of the vertical sync for field two with a width equal to a predetermined number of horizontal clock pulses. The third output of the counter circuit 92 goes high at each vertical sync pulse and counts a predetermined number of horizontal clock cycles before being reset to low, providing the STOP signal. The stop signal is inverted and input to the NOR gate 90 as an enable signal. The F1 and F2 START signals are input to the NAND gates 98, 100 respectively, the outputs of which are inverted at the inputs of OR gate 102. Therefore the three conditions required for the output of NOR gate 90 to be high are F1 and F2 START low and STOP high.

When the holdoff signal is off, the NAND gate 84 is enabled to pass the TRIG EN signal from the NOR gate 90 to preset the arm flip-flop 86 and enable the trigger generator flip-flop 88 to produce a trigger signal only during the horizontal lines defined by the F1, F2 START signals and the STOP signal. These values may be variable according to operator control, and are loaded via a microprocessor (not shown) into the counter circuit 92.

Figure 16:
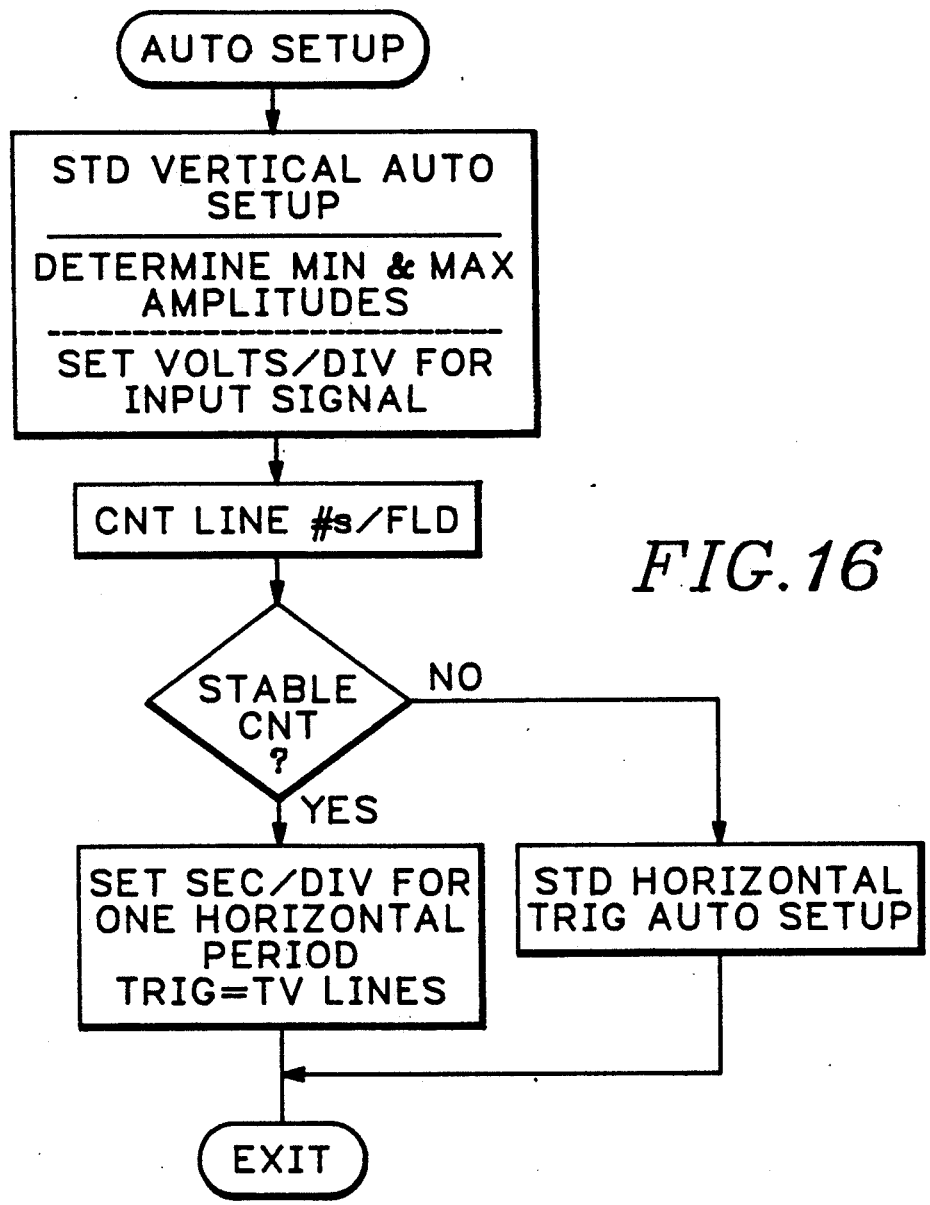
FIG. 16 is a flow chart diagram for an automatic oscilloscope setup according to the present invention.

As disclosed in U.S. Pat. No. 4,743,844 there exist auto setup algorithms that, when activated, automatically scale the vertical, horizontal and trigger systems of an oscilloscope to display an input signal completely within the confines of the display area. The drawback of such auto setup algorithms is that they do not work on an a periodic or complex waveform, such as a video signal. Therefore the auto setup algorithm of the above patent is modified to set up the hardware associated with the television features to start a search on an incoming signal applied to the television trigger circuit described above to determine whether it is a valid video signal. As shown in FIG. 16 a standard vertical automatic set up function is performed using trigger level hardware to determine the minimum and maximum values of the input signal. From these levels an appropriate volts/division setting is established. Before proceeding to the horizontal and trigger auto setups, the HDTV software sets up the HDTV hardware to count the number of lines per field, i.e., the number of horizontal clock cycles while the FLD ID is low and the number of horizontal clock cycles while the FLD ID is high. If the input signal is a valid television signal, the TV counter obtains a stable count of the number of lines per field. Otherwise the counter either does not count or has random results. If after a specified time interval, such as one-half second, the TV hardware does not lock on the incoming signal, i.e., does not provide a stable count for each field, then the normal horizontal and trigger auto setup algorithms are performed. If within the specified time interval the TV hardware detects a valid video signal, i.e., a stable line count for each field, then the horizontal system of the oscilloscope is set up to provide a horizontal setting of SEC/DIV to provide at least one horizontal line of the video line on the display based upon the particular standard determined by the total number of lines per frame and the nature of the horizontal sync pulse (bi-level or tri-level).

Another feature to automate a multi-standard instrument is an auto format select. Presently an operator has to set up the line number counting protocol according to the protocol of the input signal because line one relative to the vertical interval is different between all the present video standards. For example in PAL line one is coincident with the vertical interval; in NTSC line one occurs three lines before the vertical interval; and in the HDTV 1050/1250 protocols line one occurs immediately after the vertical interval. As shown in FIG. 17 when there is a signal change the TV counter is set up to count the number of lines per field. The number of lines per field are summed to obtain the number of lines per frame. Based upon the number of lines per frame a lookup table is accessed to determine the proper parameters for setting up the TV counter to correctly count line numbers for the standard currently selected. For example, if the total lines per frame equals 525, then the standard currently selected is NTSC and line one begins three lines prior to the vertical field sync. PAL systems contain 625 lines per frame and line one is coincident with the vertical field sync. The HDTV 1050/1250 standards contain 1050 and 1250 lines per frame, respectively, and line one begins one line after the vertical field sync. Therefore the HDTV hardware not only is used to trigger the oscilloscope on the selected TV line, but it also may be used to determine if the incoming signal is a valid TV waveform and what the TV standard of the waveform is.

Also semiautomatic television presets may be provided that can be recalled. These presets take advantage of the same hardware and software as described above for the auto setup and auto format selection functions. Once the TV standard is determined by counting the total number of horizontal lines per frame, then the software knows what horizontal sweep speed to select for the SEC/DIV switch to give the operator the proper display, whether single line, full field or frame. Knowing the standard allows the software to automatically set up the gated lines trigger hardware of FIG. 14 for ACTIVE VIDEO trigger mode and the different setups necessary to display the vertical blanking interval. For example a LINES setup automatically sets the instrument to display a single horizontal line and trigger on all horizontal lines; a FIELD setup automatically sets the instrument to display a single field of video data, alternating between fields; a FRAME setup automatically displays a full frame of video data; a LINESEL setup automatically displays only a single horizontal line selected by the operator; an ACTVID setup automatically displays a single horizontal line and triggers on each active video horizontal line; an H-BLANK setup automatically displays the horizontal blanking interval of the active video horizontal lines; a V-BLANK setup automatically displays the vertical blanking interval for each field; and a PIXEL setup automatically displays a small number, such as 5-6, of pixels from a single horizontal line selected by the operator using the B sweep. In each of these stored setups as shown in FIG. 18 the horizontal system is automatically set up with the appropriate horizontal sweep rate and trigger signals dependent upon the TV standard determined from the input signal.

Thus the present invention provides a multi-standard video option for an oscilloscope that detects a video standard based upon the width of the horizontal blanking interval by using a ramp signal adapted to operate with either a bi-level or tri-level horizontal sync pulse, and then using the detected standard to set up the instrument by identifying each field and adjusting the horizontal sweep.

What is claimed is:

1. A multi-standard video option for an oscilloscope comprising:
    means for generating a ramp signal from a horizontal sync pulse of a composite sync signal derived from an input video signal;
    means for reversing the slope of the ramp signal for a tri-level horizontal sync pulse when the horizontal sync pulse changes polarity;
    means for rapidly discharging the ramp signal to zero for a bi-level horizontal sync pulse when the horizontal sync pulse changes polarity; and
    means for determining from the ramp signal a digital trigger signal pulse having a width equal to the width of the horizontal sync pulse.

2. A multi-standard video option as recited in claim 1 further comprising means for decoding from the digital trigger signal pulse width a video standard for the input video signal.

3. A multi-standard video option as recited in claim 2 further comprising means for identifying each field of the input video signal as a function of the composite sync signal, a horizontal clock frequency signal and the video standard.

4. A multi-standard video option as recited in claim 3 further comprising means for adjusting the horizontal sweep of the oscilloscope as a function of the video standard and a selected setup.

5. A multi-standard video option as recited in claim 4 further comprising means for limiting as a function of the video standard the horizontal lines upon which the oscilloscope horizontal sweep triggers to only active video horizontal lines of the input video signal.

6. A multi-standard video option as recited in claim 5 further comprising means for specifying a start and a stop line within the active video horizontal lines for the limiting means.

7. A multi-standard video option as recited in claim 1 wherein the ramp generator comprises a Miller integrator having the composite sync signal as an input and providing the ramp signal as an output.

8. A circuit for generating a field identification signal for an input video signal comprising:
    means for determining whether the input video signal is an interlaced or a non-interlaced signal to produce an interlaced indicator;
    means for determining whether the input video signal is a video signal having a video sync pulse that occurs at the beginning of a horizontal line of the input video signal for each field to produce a special indicator; and
    means for generating from the outputs of the two determining means the field identification signal.

9. A circuit as recited in claim 8 wherein the first determining means comprises:
    means for deriving a vertical sync signal from a composite sync signal obtained from the input video signal;
    means for sampling the vertical sync signal with a horizontal clock to generate a field trigger signal; and
    means for timing the interval between consecutive field trigger signals to generate the interlaced indicator.

10. A circuit as recited in claim 8 wherein the second determining means comprises:
    means for deriving a vertical sync signal from a compositie sync signal obtained from the input video signal;
    means for sampling the vertical sync signal with the compositie sync signal to generate a special field trigger signal; and
    means for timing the interval between consecutive special field trigger signals to generate the special indicator.

11. A circuit for triggering an oscilloscope only during specified lines of a video signal comprising:
    means for generating a trigger signal in response to a horizontal clock signal derived from the video signal;
    means for arming the generating means in response to a trigger enable signal; and
    means for generating the trigger enable signal as a function of the horizontal clock signal, a field identification signal derived from the video signal, and a vertical sync signal derived from the video signal.

12. A circuit as recited in claim 11 wherein the trigger enabling signal generating means comprises:
    a counter having as inputs the horizontal clock signal, the field identification signal and the vertical sync signal and outputting a field one start signal starting at the leading edge of the vertical sync signal for field one as determined by the field identification signal with a width determined by a first count of horizontal clock signal pulses, a field two start signal starting at the leading edge of the vertical sync signal for field two as determined by the field identification signal with a width determined by a second count of horizontal clock signal pulses, and a field stop signal starting at the leading edge of each pulse of the vertical sync signal with a width determined by a third count of horizontal clock signal pulses; and
    means for combining the field one start, field two start and field stop signals to produce the trigger enable signal, the trigger enable signal extending between the end of the respective field start signals to the end of the field stop signal.

13. A circuit as recited in claim 12 further comprising means for selectively varying the values for the first, second and third counts for the counter to control the start and stop lines for the trigger enable signal.

14. A method of automatically setting up an oscilloscope to display an input video signal comprising the steps of:

automatically determining from the input video signal a television standard for the input video signal;

determining a maximum and a minimun level for the input video signal;

setting a volts/division value for the oscilloscope so that all levels of the input video signal are contained within the oscilloscope display area;

setting up a counter to count the number of video lines per field of the input video signal; and setting up a seconds/division value for the oscilloscope so that at least one horizontal line of the input video signal is contained within the oscilloscope display area.

15. A method of automatically selecting a format for displaying an input video signal on an oscilloscope display area comprising the steps of:

determining from a composite sync signal derived from the input video signal the number of video lines per frame for the input video signal;

accessing a lookup table based upon the number of video lines per frame to determine where line one of the input video signal occurs with respect to a vertical sync signal derived from the input video signal; and setting up a counter to count lines starting with line one of the input video signal based upon the output of the lookup table.

16. A method of automatically presetting an oscilloscope display to display a selected format for an input video signal comprising the steps of:

automatically determining from the input video signal a standard for the input video signal;

setting a seconds/division value for the oscilloscope display as a function of the selected format and the standard; and setting up a region of the input video signal to be displayed determined by a start and a stop line for each field of the input video signal, the start and stop lines being programmable according to the selected format.

17. A method of automatically determining a standard for an input video signal comprising the steps of:

detecting whether the horizontal sync pulses of a composite sync signal for the input video signal are bi-level or tri-level to produce a digital output signal;

generating from the composite sync signal and a horizontal clock signal phase locked to the composite sync signal a field identification signal;

counting the number of horizontal lines in each field of the input video signal to determine a number of lines per frame for the video input signal; and determining from the width of the digital output signal, the field identification signal and the number of lines per frame the standard for the input video signal.

* * * * *